United States Patent
Petelka (10) Patent No.: US 9,126,471 B2
(45) Date of Patent: Sep. 8, 2015

(54) ROLLING TARPAULIN SYSTEM FOR SELECTIVELY COVERING AND UNCOVERING TRAILERS FOR TRUCKS

(71) Applicant: Brian Petelka, Burlington (CA)

(72) Inventor: Brian Petelka, Burlington (CA)

(*) Notice: Subject to any disclaimer, the term of this patent is extended or adjusted under 35 U.S.C. 154(b) by 0 days.

(21) Appl. No.: 13/874,113

(22) Filed: Apr. 30, 2013

(65) Prior Publication Data

US 2014/0138982 A1 May 22, 2014

Related U.S. Application Data (60) Provisional application No. 61/640,414, filed on Apr. 30, 2012.

(51) Int. Cl.
| | | |
|---|---|---|
| *B60P 7/04* | (2006.01) | |
| *B60J 7/08* | (2006.01) | |
| *B60J 5/06* | (2006.01) | |

(52) U.S. Cl.
CPC . *B60J 7/085* (2013.01); *B60J 5/067* (2013.01)

(58) Field of Classification Search
CPC ........... B62D 33/0207; B62D 33/0222; B62D 33/04; B60Q 1/2615; B60Q 1/32; B60J 7/085; B60J 5/065; B60J 7/104; B60J 7/065; B60J 5/067; B60J 7/062; B60J 7/102
USPC .................. 296/98, 105, 100.14, 141, 186.2, 296/100.12; 16/69, 70, 78
See application file for complete search history.

(56) References Cited

U.S. PATENT DOCUMENTS

| | | | | |
|---|---|---|---|---|
| 5,050,923 | A * | 9/1991 | Petelka | 296/98 |
| 6,199,935 | B1 * | 3/2001 | Waltz et al. | 296/98 |
| 6,513,856 | B1 * | 2/2003 | Swanson et al. | 296/98 |
| 6,634,697 | B1 * | 10/2003 | Petelka | 296/100.12 |
| 6,783,168 | B2 * | 8/2004 | Searfoss | 296/98 |
| 7,195,304 | B1 * | 3/2007 | Schmeichel | 296/98 |
| 7,703,833 | B2 * | 4/2010 | Petelka | 296/98 |
| 7,726,720 | B2 * | 6/2010 | Searfoss | 296/100.01 |
| 2002/0021018 | A1 * | 2/2002 | Royer | 296/98 |

* cited by examiner

*Primary Examiner* — Glenn Dayoan
*Assistant Examiner* — Sunsurraye Westbrook
(74) *Attorney, Agent, or Firm* — Jonathan A. Kidney; TechLaw, LLP (57) ABSTRACT

A system for selectively covering and uncovering an opening of a trailer for trucks, comprising at least two tracks mounted to the trailer, at least two roller assemblies, each mounted for rolling movement along one of the tracks between a covered position and an uncovered position, an elongate roller bar extending between and supported by the at least two roller assemblies, and a drive mechanism operatively connected to the roller bar to rotate the roller bar about its elongate axis. The roller bar is adapted to receive a cover in a rolled configuration in which the opening of the trailer is not covered by the cover, when the roller assemblies are in the uncovered position. The roller bar is further adapted to receive the cover in an unrolled configuration in which the cover covers the opening, when the roller assemblies are in the covered position.

19 Claims, 14 Drawing Sheets

ROLLING TARPAULIN SYSTEM FOR SELECTIVELY COVERING AND UNCOVERING TRAILERS FOR TRUCKS

This application claims priority based on U.S. Patent Application 61/640,414 entitled "ROLLING TARP SYSTEM FOR TRUCKS" filed Apr. 30, 2012, which is herein incorporated by reference.

FIELD OF INVENTION

The invention relates to covering systems for truck trailers, such as flat bed trailers. More particularly, the invention relates to a roll-up or wind-up tarpaulin system for providing access to a truck trailer for a multitude of industries.

BACKGROUND

Various means for covering and uncovering trailers for trucks, and openings thereto, are known in the art. Several of such means utilize tarpaulins for covering and uncovering access points (which can vary in size from a few square feet to openings comprising the entire side of a trailer) by selectively rolling the tarpaulin up about a rod or spindle, to uncover the access point, or unrolling the tarpaulin from the rod or spindle, to cover the access point. Many of such tarpaulin systems require additional arms that slide, retract, telescope or elongate in order to create a controlled means for the tarp to roll or unroll either vertically or horizontally about the truck body.

SUMMARY OF THE INVENTION

The present invention provides a rolling tarpaulin system for selectively covering and uncovering trailers for trucks, which does not require the use of additional arms that must slide, retract, telescope or elongate in order to controllably roll or unroll a tarpaulin to cover or uncover a truck.

In one embodiment, there is provided a system for selectively covering and uncovering an opening of a trailer for trucks, comprising: at least two tracks mounted to the trailer; at least two roller assemblies, each mounted for rolling movement along one of the tracks between a covered position and an uncovered position; an elongate roller bar extending between and supported by the at least two roller assemblies; a drive mechanism operatively connected to the roller bar to rotate the roller bar about its elongate axis; and a tarpaulin, the tarpaulin extending over and covering the opening when the roller assemblies are in the covered position, the tarpaulin being supported in a rolled fashion on the roller bar, leaving the opening uncovered, when the roller assemblies are in the uncovered position.

In another embodiment, there is provided a system for selectively covering and uncovering an opening of a trailer for trucks, comprising: at least two tracks mounted to the trailer; at least two roller assemblies, each mounted for rolling movement along one of the tracks between a covered position and an uncovered position; an elongate roller bar extending between and supported by the at least two roller assemblies; and a drive mechanism operatively connected to the roller bar to rotate the roller bar about its elongate axis; the roller bar adapted to receive a cover in a rolled configuration in which the opening of the trailer is not covered by the cover, when the roller assemblies are in the uncovered position, said roller bar further adapted to receive the cover in an unrolled configuration in which the cover covers the opening, when the roller assemblies are in the covered position.

DETAILED DESCRIPTION OF EMBODIMENTS

Figure 1:
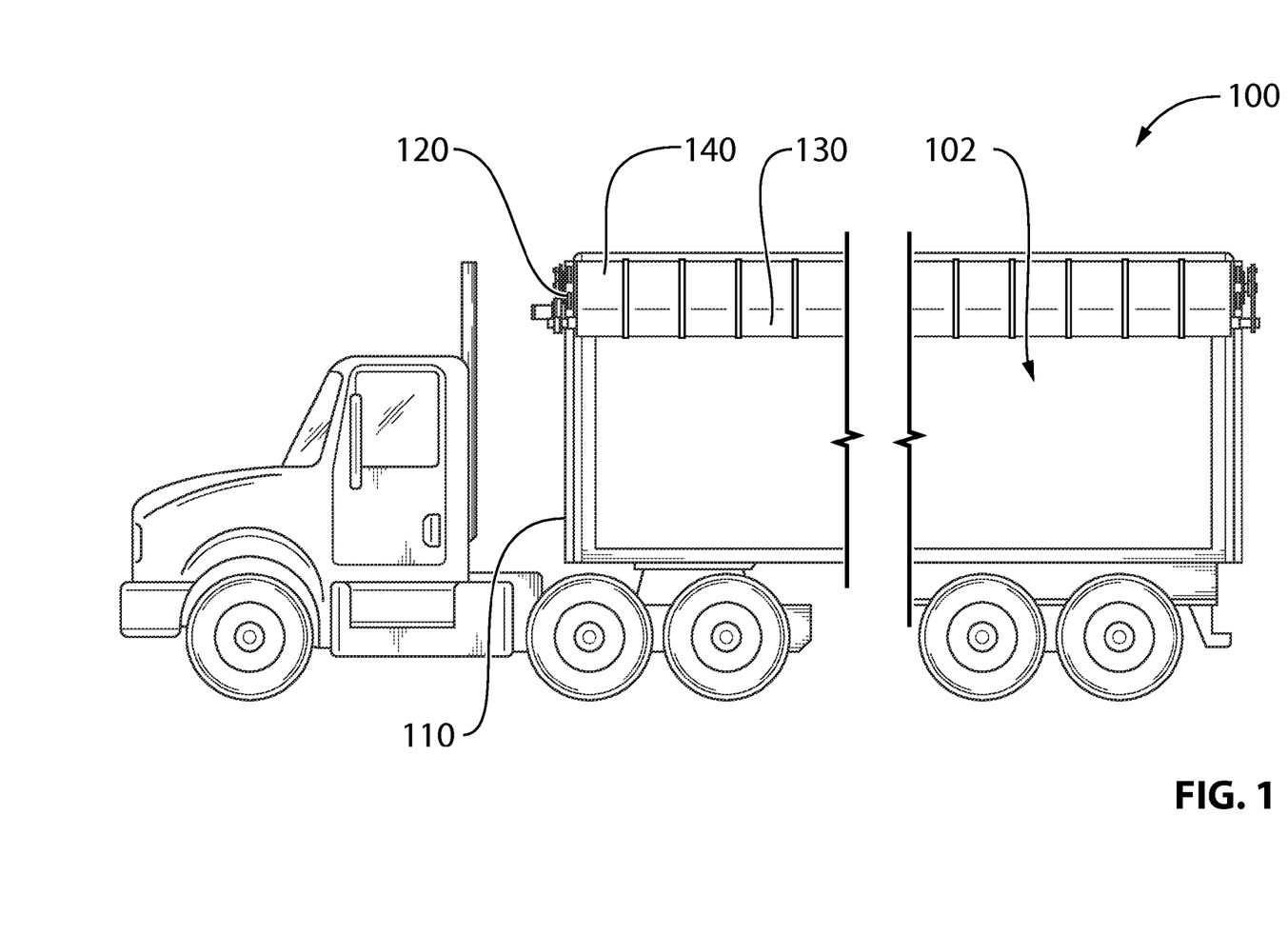
FIG. 1 is a photograph of the system showing the tarp in a partially rolled-up position.

The invention will now be described with reference to the particular embodiments thereof disclosed in the attached photographs. FIG. 1 shows one example of a truck trailer 100 on which the system of the present invention can be mounted. The trailer 100 is completely open on either side; embodiments of the present invention are provided to selectively cover and uncover the open sides or openings 102 of the trailer. It will be appreciated, however, that the system of the present invention can be used on trailers that are completely open on only one side, or on an end, and can be used on trailers that are open on the top side. The invention also can be used on trailers that are open on both a side and an end, and a single tarp mounted to and controlled by the system of the present invention can be used to selectively cover and uncover both the open side and the open end. The present invention also can be used to selectively cover and uncover smaller openings in sides of trailers (i.e., openings that do not constitute an entire open side).

Figure 3:
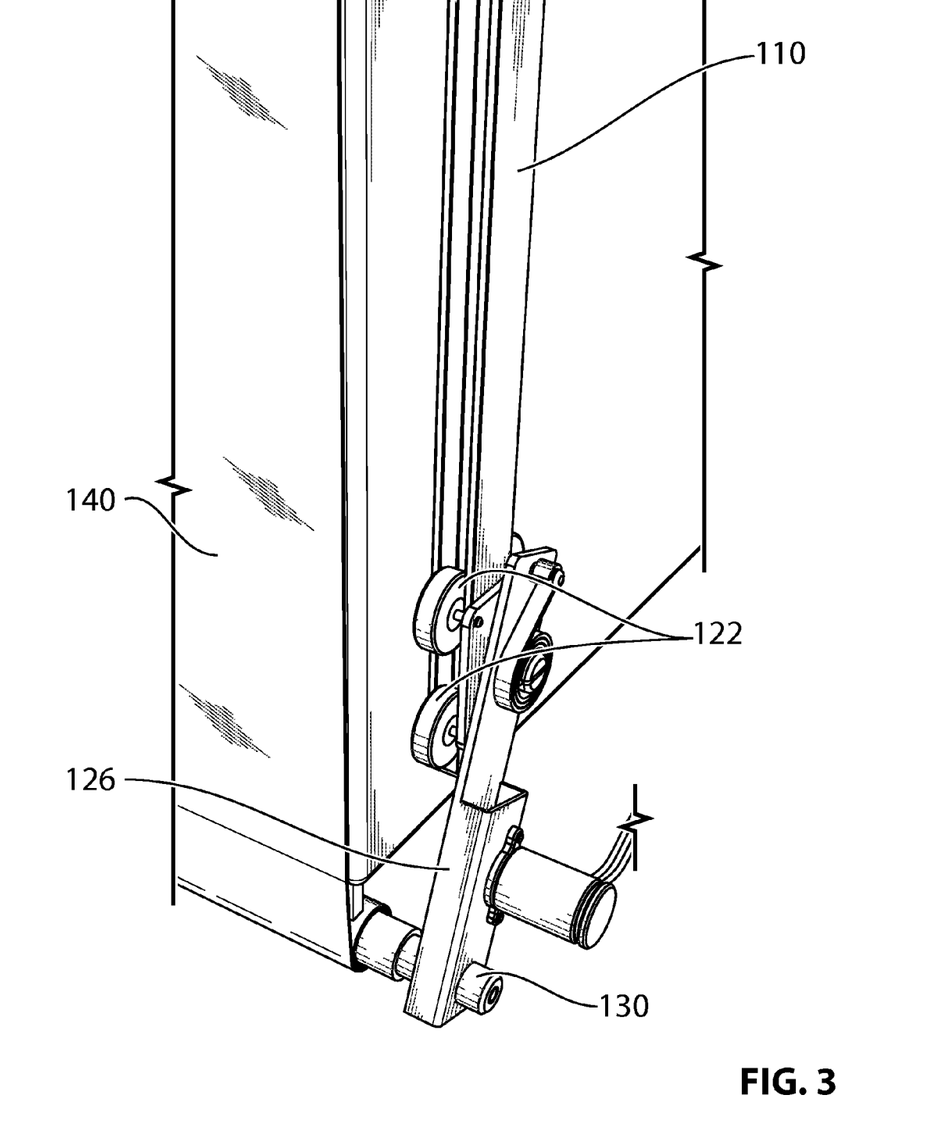
FIG. 3 is a photograph of the system from the front of the trailer showing the tarp in an unrolled and closed position.
Figure 4:
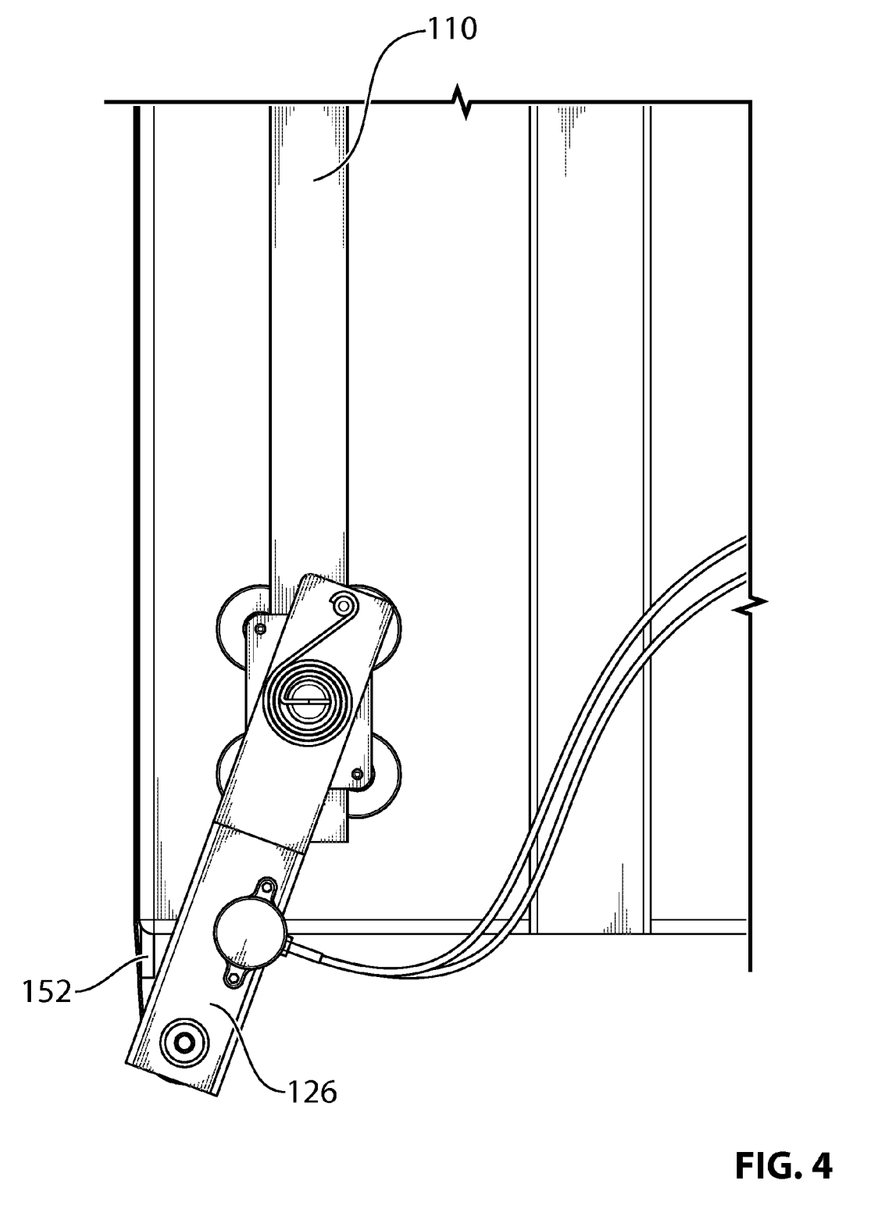
FIG. 4 is a photograph of the system mounted on the front of a trailer.
Figure 5:
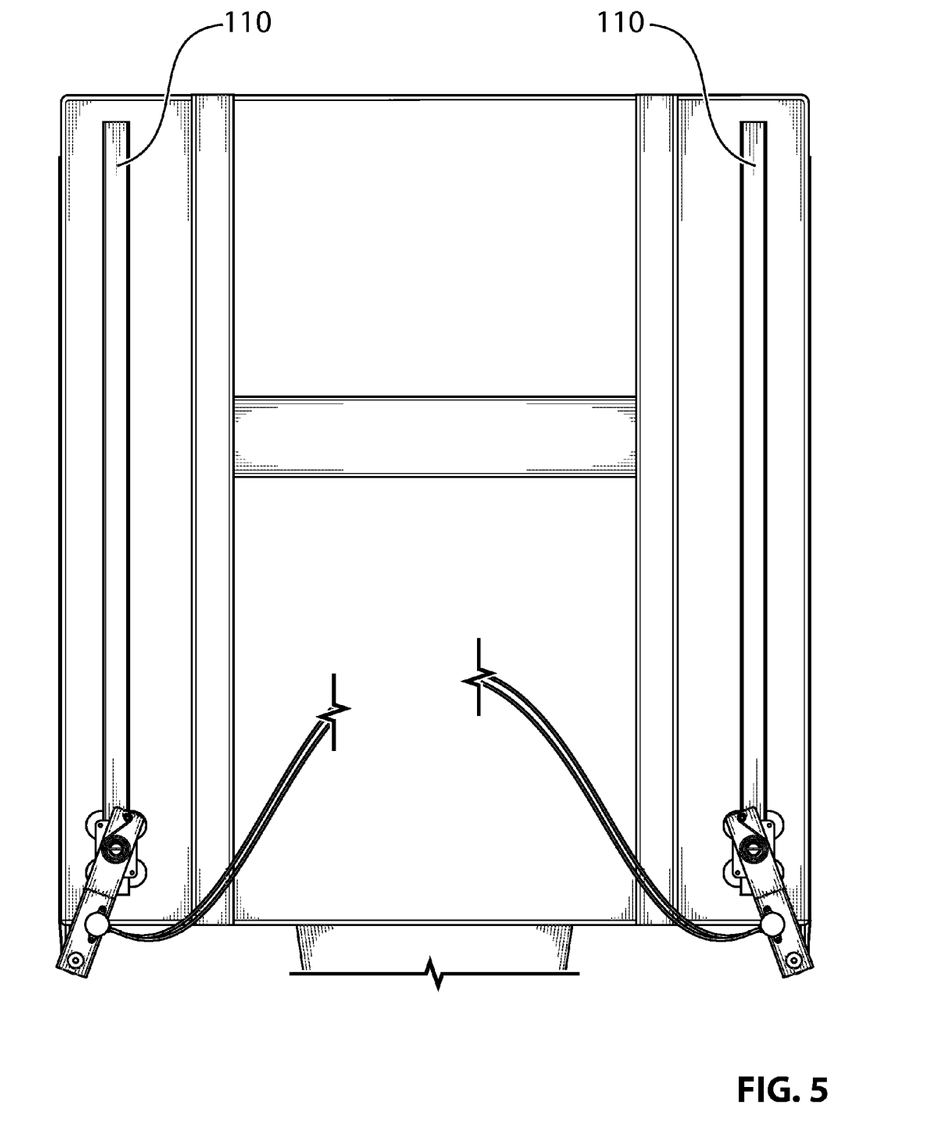
FIG. 5 is a photograph of a trailer incorporating the system.

The system of the present invention includes at least two tracks mounted to the truck trailer. Examples 110 of such tracks can be seen in FIGS. 3-5, which show two tracks 110 mounted to a front end of the trailer 100, each track 110 being adjacent to one of the open sides of the trailer 100. Two additional, corresponding tracks 110 are mounted to the rear end of the trailer, adjacent to the open sides of the trailer. The tracks 110 can be of any size and shape, and be made of any suitable material to allow the tracks 110 to receive rollers 120 (of the type that will be described below) and allow the rollers 120 to roll up and down the tracks 110. The tracks 110 have an "I"-shaped cross section, allowing rollers 122 to be received on either side of the track 110.

The system of the present invention further comprises at least two roller assemblies, each of which are mounted to roll up and down along one of the tracks. The trailer 100 depicted in the attached figures comprises four roller assemblies, two for each open side of the trailer 100 to be selectively covered and uncovered. An example embodiment 120 of the roller assembly can be seen in FIG. 6. The roller assembly 120 comprises four rollers 122 in the form of solid discs, which are provided in the tracks 110 such that the can roll up and down the tracks 110. Two rollers 122 are provided on each side of the track 110 to which they are mounted.

Figure 6:
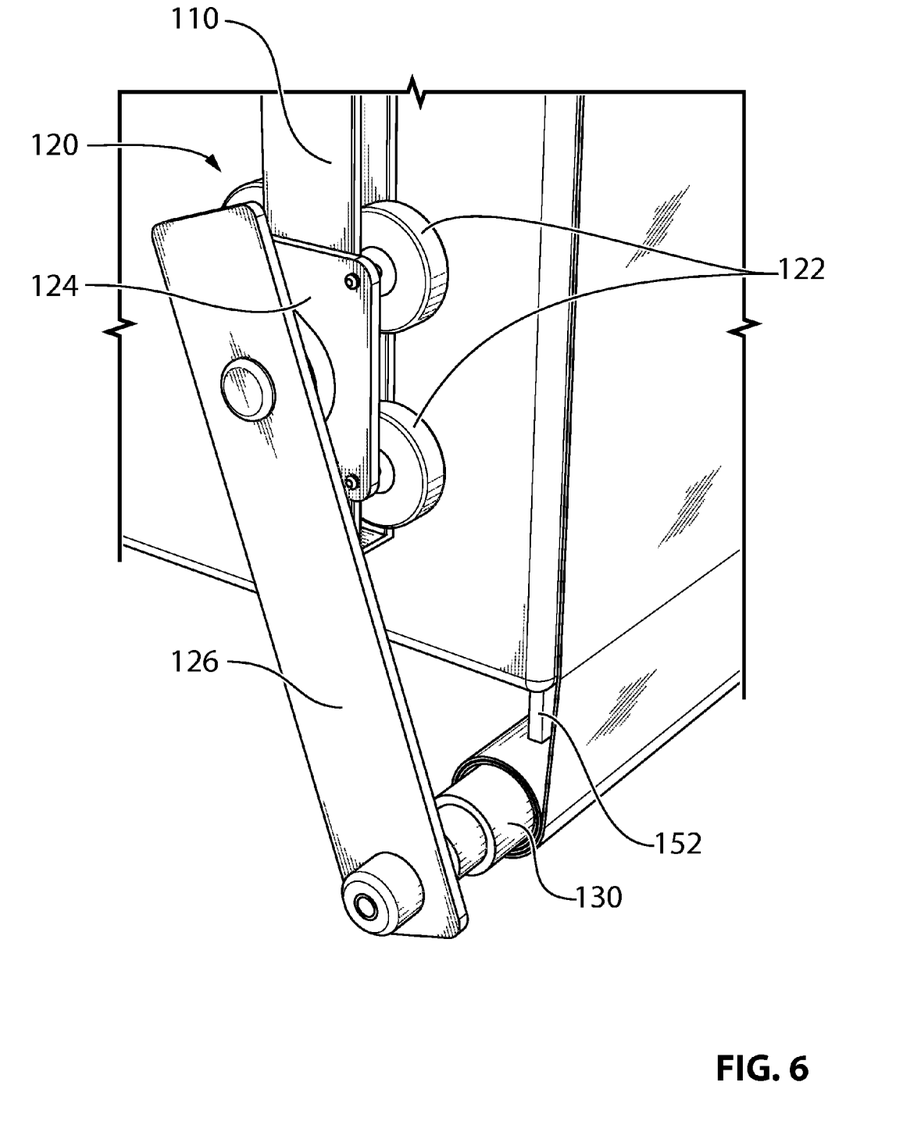
FIG. 6 is a photograph of the rear bracket with spring.
Figure 7:
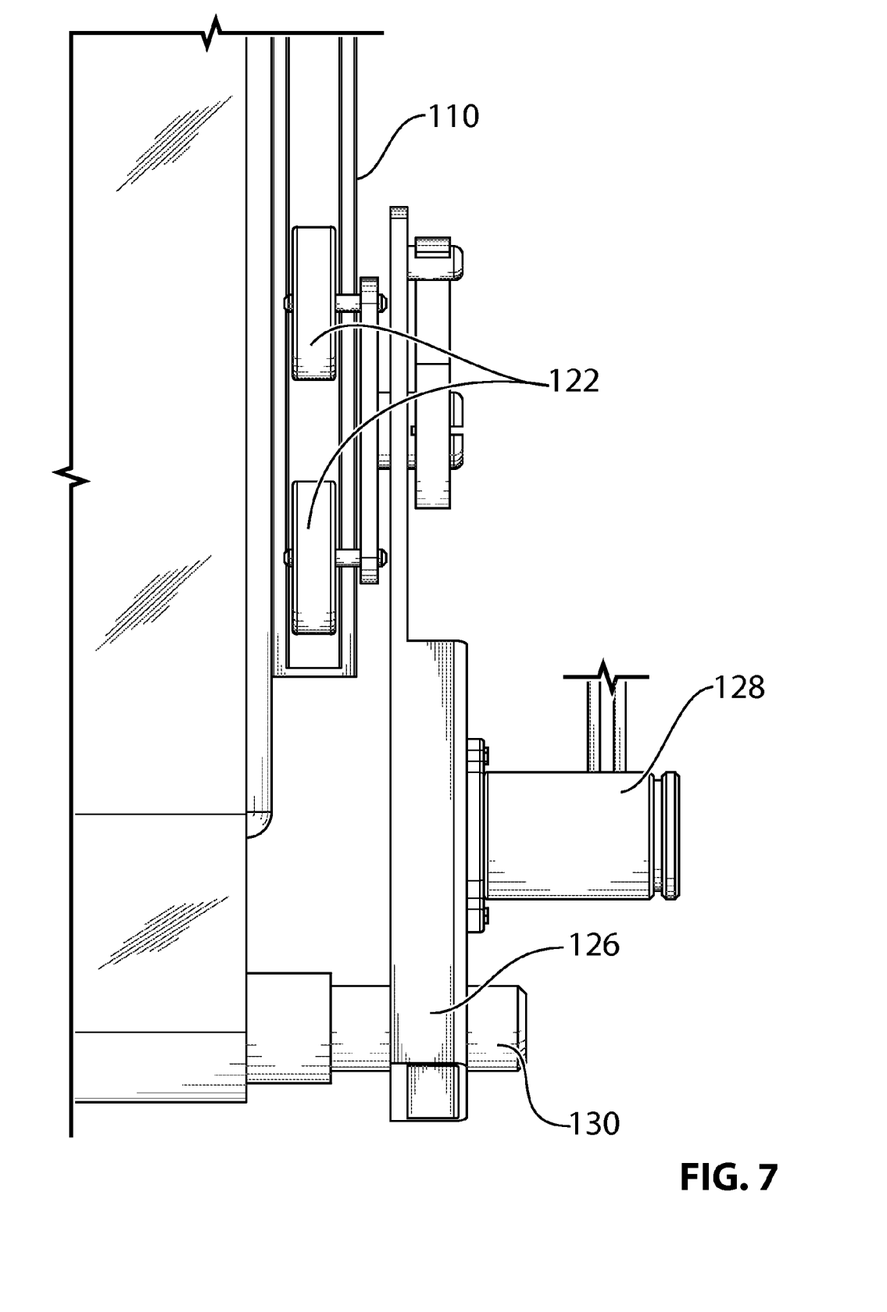
FIG. 7 is a photograph of the front motor cover of the system.
Figure 8:
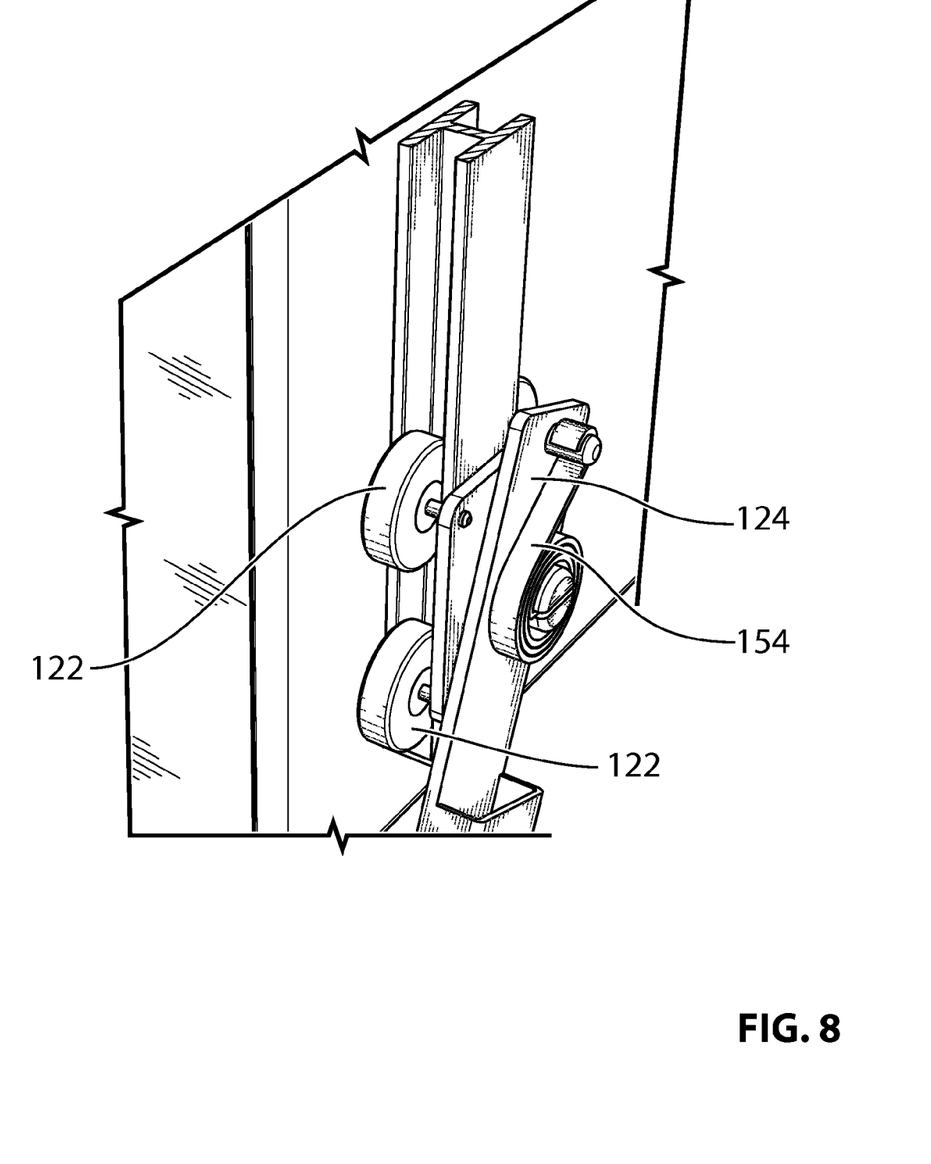
FIG. 8 is a photograph of the front spring with rollers.

The rollers 122 are rotatably mounted to a frame 124 having a frame arm 126 pivotally attached thereto. The frame 124 and frame arm 126 are free slide up and down the track 110 to which they are mounted via the rollers 122. As will be seen below, the frame 124 and frame arm 126 are intended to support the roller bar 130 to which a cover, such as a tarpaulin, may be affixed; the frame 124 and frame arm 126 can therefore be made of any material having any dimensions suitable for this purpose.

It should be noted that the frame arm 126 need only pivot about its attachment point on the frame 124 in order for the system of the present invention to operate. The frame arm 126 does not need to slide, retract, telescope or elongate in any way (although it may if such action is desirable).

The present invention further comprises a roller bar supported at each end thereof by one of the roller assemblies. An example 130 of the roller bar can be seen in FIG. 1. The roller bar 130 extends from an attachment point on the frame arm 126 of one roller assembly 120 at one end of the trailer 100, to a corresponding attachment point on the frame arm 126 of another roller assembly 120 at the other end of the trailer 120. The roller bar 130 is rotatably mounted to each of the frame arms 126 such that it can rotate about its own elongate axis (i.e., the axis running along the length of the trailer 100). The roller bar 130 can be of any dimensions, and made of any material, such that it is suitable for supporting a tarpaulin (or other suitable cover for the trailer 100) in a rolled fashion around the roller bar 130.

Figure 12:
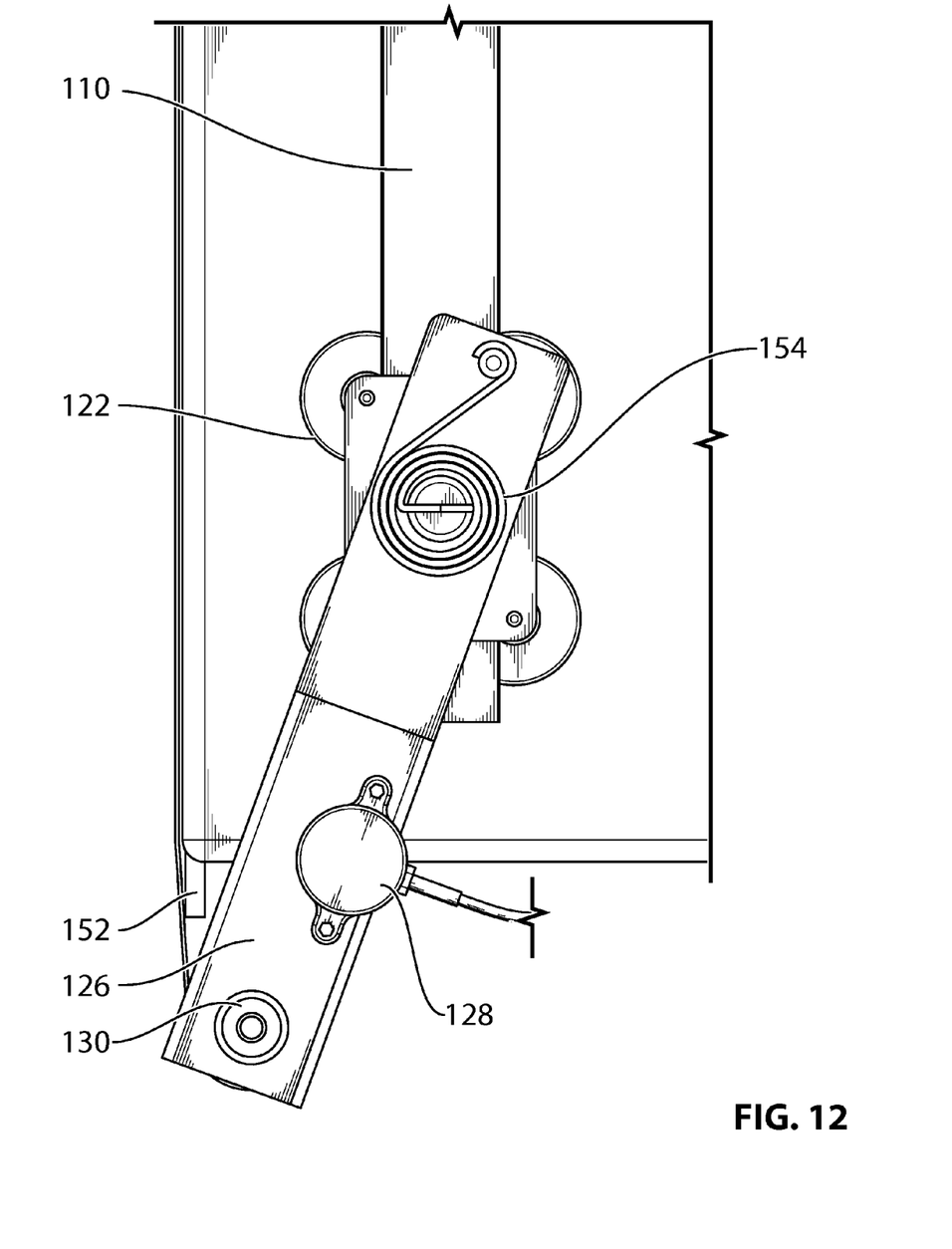
FIG. 12 is a photograph of the front assembly of the system with switch.
Figure 13:
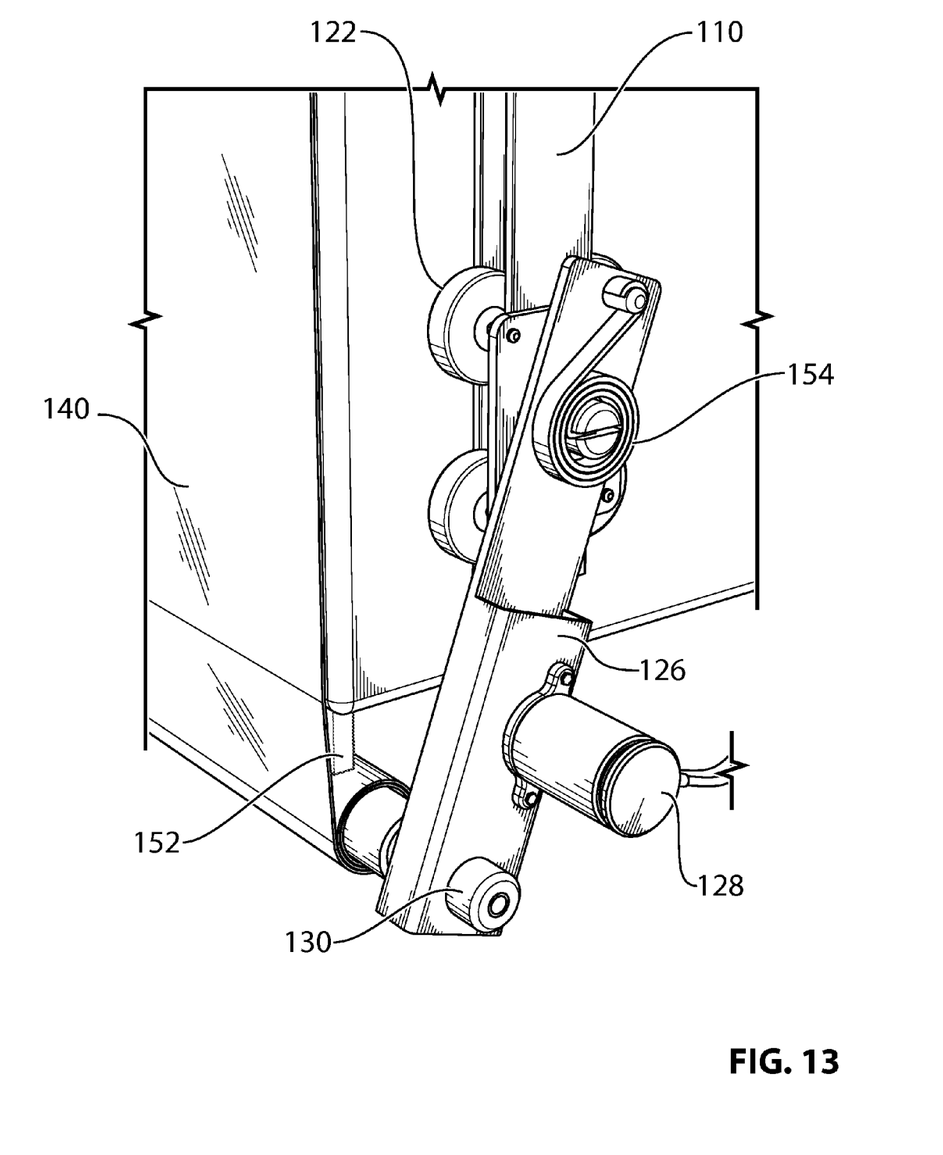
FIG. 13 is a photograph of the front roller assembly.
Figure 14:
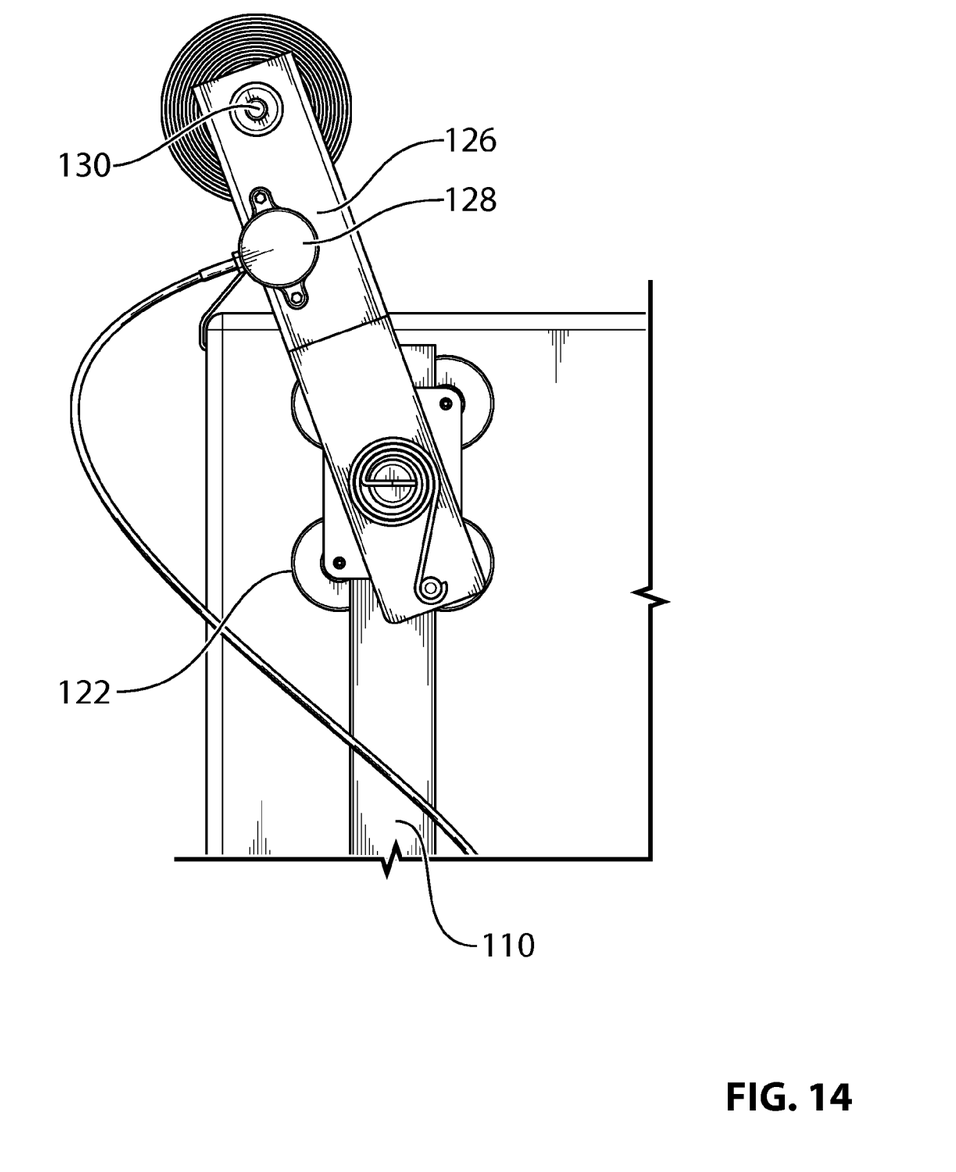
FIG. 14 is a photograph of the front motor assembly with the tarp in a rolled-up position.

The present invention also comprises a drive mechanism for driving the roller assembly up and down the tracks. In the embodiment depicted in the figures, the drive mechanism comprises an electric motor 128, as shown in FIGS. 12-14. The electric motor 128 is mounted to the frame arm 126 of the roller assembly 120 located at the front end of the trailer 100, such as by welding or other suitable means, and is operatively connected to the roller bar 130 to rotate the roller bar 130 about its own elongate axis. It should be understood, however, that the motor 128 could be mounted to the frame arm 126 of the other roller assembly 120. Alternatively, the system could be provided with two motors 128, one on each frame arm 126 of each roller assembly 120.

As will be explained in greater detail below, when the roller bar 130 is supporting a tarpaulin (or other suitable cover) in either rolled or unrolled fashion, the rotation of the roller arm 130 about its elongate axis will cause: (a) the tarpaulin (or other suitable cover) to either roll up around or unroll from the roller bar 130; and (b) the roller assemblies 120 to roll up or down the tracks 110.

In other embodiments (not shown) the motor 128 (or other suitable drive mechanism) can be operatively connected to the rollers 122 to propel the rollers 122 (and along with them the frame 124, frame arm 126, the motor 128 and the roller bar 130) up and down the track 110. The motor 128 can be operatively connected to the rollers 122 in any suitable manner to deliver torque thereto, such as by a gear mechanism, or with a drive belt.

It will be apparent to those of skill in the art that the motor 128 can be mounted to the roller assembly 120 (i.e., any component thereof), in any suitable manner to allow for the operation described above.

The motors 128 shown in the figures are connected to an external source of electrical power via standard extension cables. However, it will be apparent to those of skill in the art that the motors 128 can be connected to any suitable source of electrical power, including the battery of the truck to which the trailer is connected.

Figure 2:
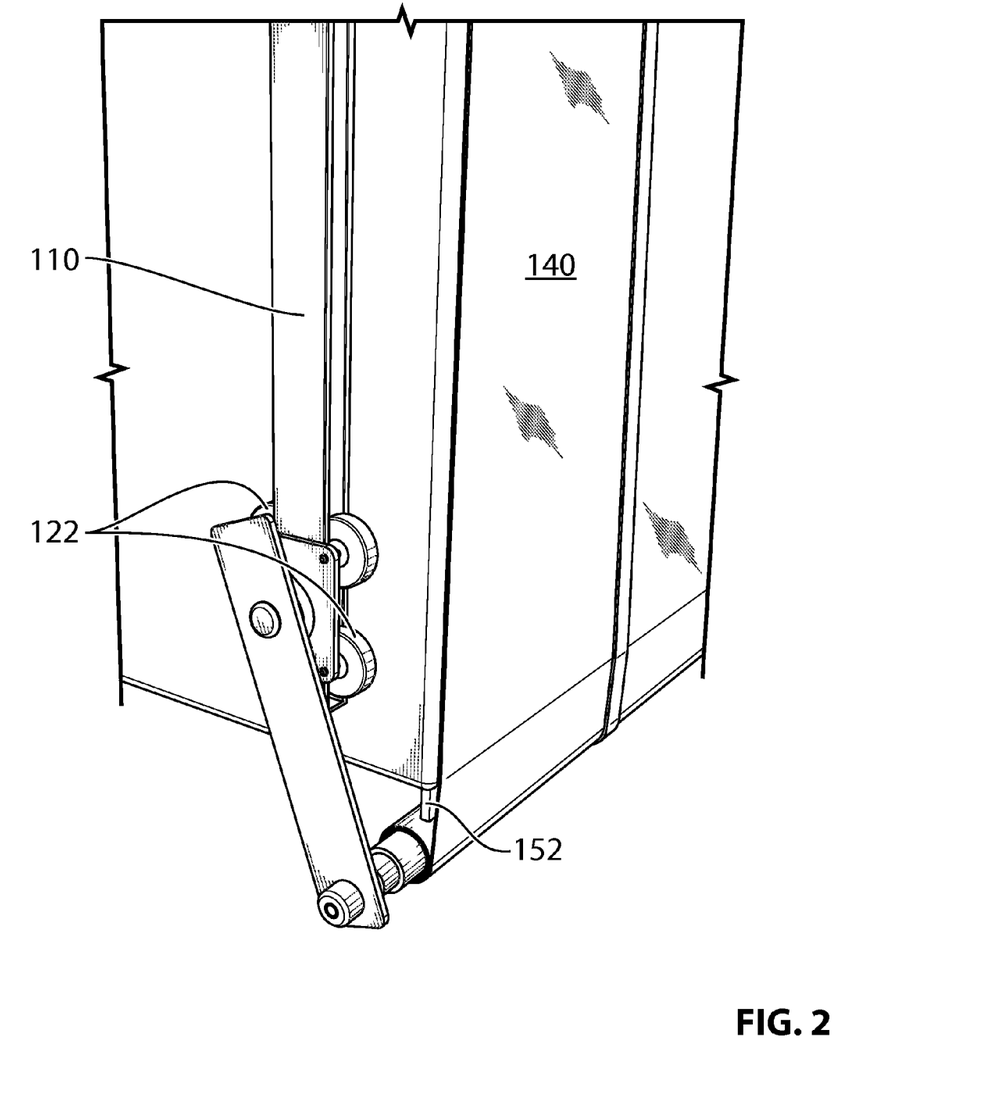
FIG. 2 is a photograph of the system from the rear of the trailer showing the tarp in an unrolled and closed position.

A tarpaulin (or other cover suitable to cover the opening 102 in the trailer 100) may be included, or may be added to the system, for selectively extending over and covering the opening 102 in the trailer 100, and being supported in a rolled fashion by the roller bar 130, exposing the opening in the trailer. An example of a tarpaulin 140 is depicted in FIGS. 1 and 2. The tarpaulin 140 can function in the manner described above by having one end affixed to the roller bar 130, and an opposite end affixed to the trailer 100 along a top edge of the opening 102. The tarpaulin 140 is dimensioned such that, when the roller bar 130 is at a bottom edge of the opening 102 in the trailer 100, the tarpaulin 140 extends from the roller bar 130 up to the top edge of the opening 102, thus covering the opening 102. Conversely, when the roller bar 130 is at the top edge of the opening 102 of the trailer 100, the tarpaulin 140 can be rolled around the roller bar 130, thus exposing the opening 102 of the trailer 100.

In operation, when the opening 120 of the trailer 100 is uncovered, the roller assemblies 120 are in an uncovered position at the top end of the tracks 110, as shown in FIG. 14. As well, the tarpaulin 140 is supported by the roller bar 130 in a rolled up fashion. The roller assemblies 120 are supported in the uncovered position by the attachment of the tarpaulin 140 to the trailer 100 along the top edge of the opening 102, and by the motor 128, which prevents rotation of the roller bar 130 that would otherwise allow the tarpaulin 140 to unroll off of the roller bar 130.

To cover the opening 102 in the trailer, a user activates the motor 128 to rotate the roller bar 130 about its elongate axis in a direction in which the tarpaulin 140 will unroll off of the roller bar 130. As the tarpaulin 140 unrolls, the frame arms 126 pivot such that the roller bar 130 moves closer to the bottom of the trailer 100, and the roller assemblies 120 begin to roll toward the bottom of the trailer 100. FIG. 1 depicts the roller bar 130 and roller assemblies 120 in a partially covered position, part way down the tracks 110. As rotation of the roller bar 130 by the motor 128 continues, the tarpaulin 140 continues to extend and the roller assemblies 120 continue their descent down the tracks 110. Eventually, the roller assemblies 120 reach a covered position at the bottom of the tracks 110, as shown in FIG. 2. At this position, the tarpaulin 140 is extended over substantially all of the opening 120 in the trailer, thus covering the opening 102.

To uncover the opening 102, a user simply activates the motor 128 to rotate the roller bar 130 about its elongate axis in the reverse direction, rolling the tarpaulin 140 up about the roller bar 130. As the tarpaulin 140 rolls up, the frame arms 126 pivot such that the roller bar 130 moves upward, closer to the top of the trailer 100, and the roller assemblies 120 begin to roll upward toward the top of the trailer 100. Eventually, the tarpaulin 140 is wound substantially completely around the roller bar 130, at which point the roller assemblies 120 will be supported in the uncovered position adjacent the top of the trailer 100 once again.

Figure 9:
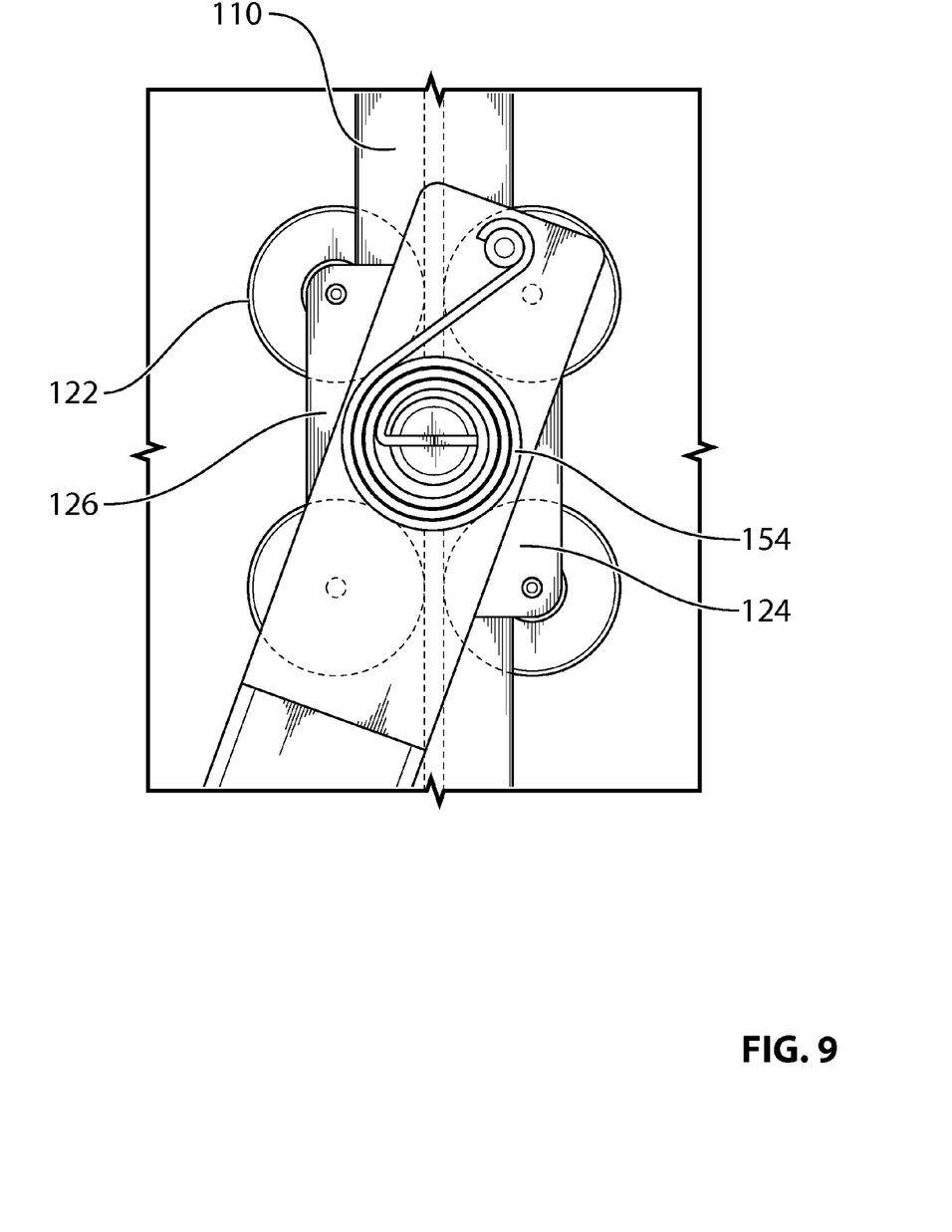
FIG. 9 is a photograph of the front spring of the system.
Figure 10:
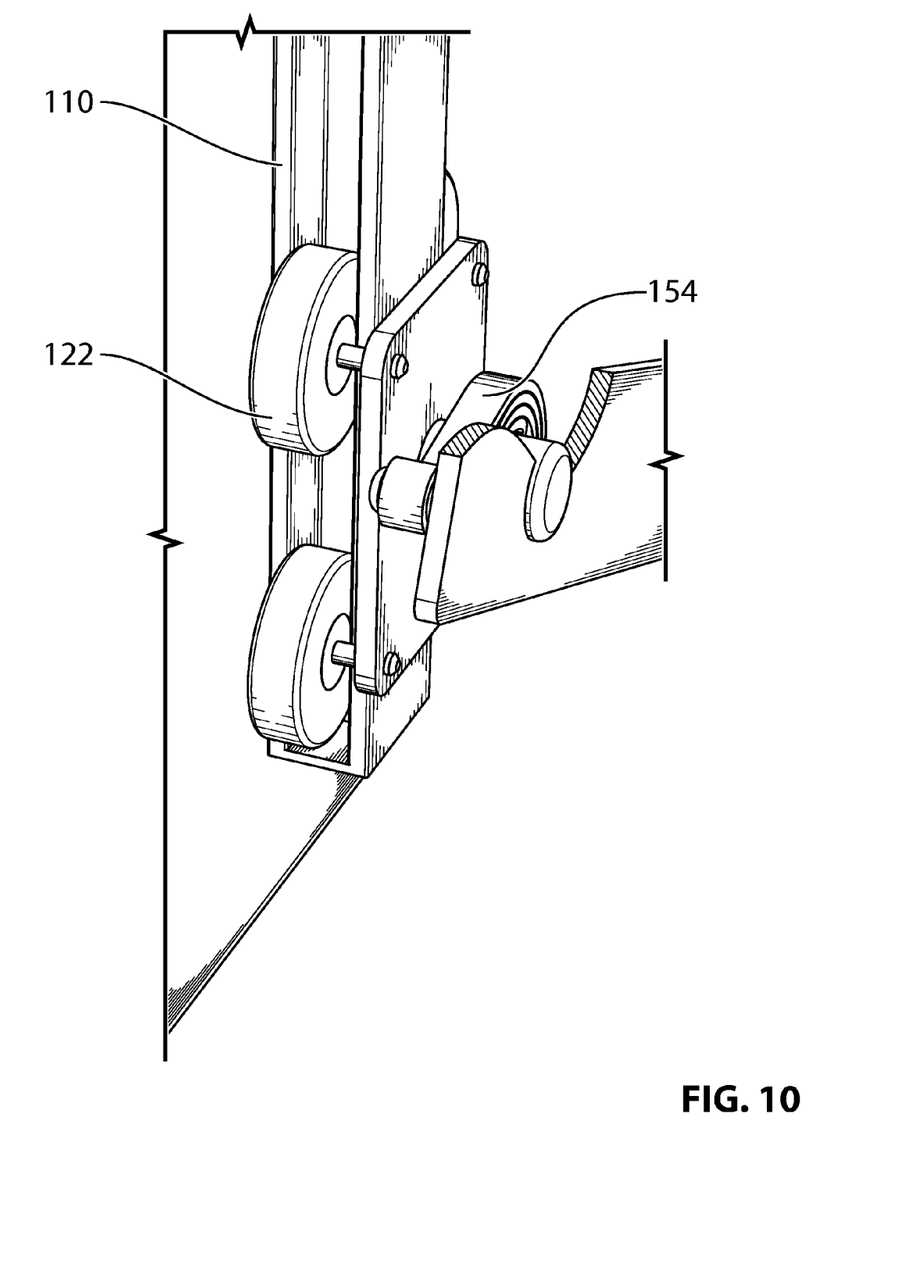
FIG. 10 is a photograph of the rear bracket with spring and wheels.
Figure 11:
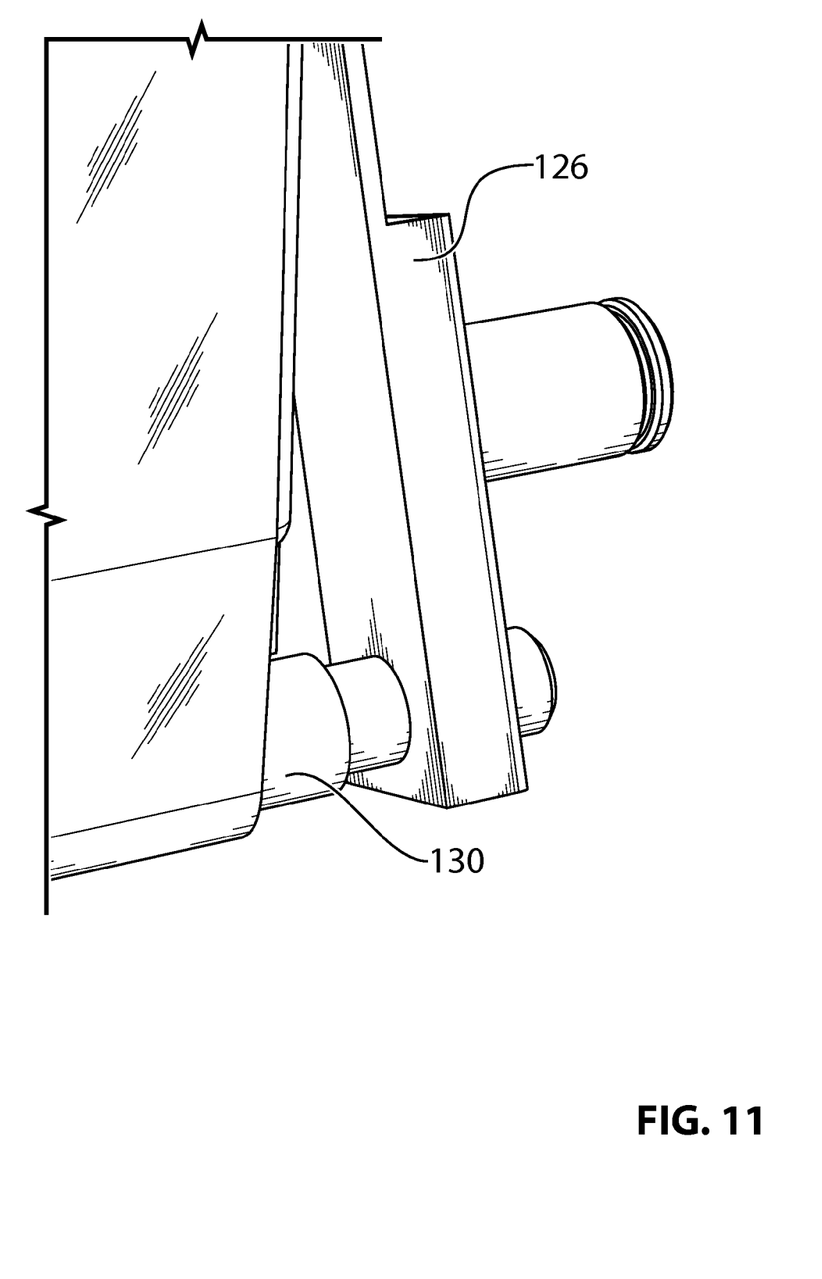
FIG. 11 is a photograph of the back side of the front motor and roll pipe.

Optionally, the system of the present invention can have a biasing mechanism for holding the roller assembly in the covered position and the tarpaulin extended over the opening in the trailer. One example 150 of such a biasing mechanism is shown in the figures, particularly in FIGS. 6, 9 and 12. A flange 152 is provided along the bottom edge of the trailer 100, below the bottom edge of the opening 102 in the trailer 100. The flange 152 has a "J"-shaped cross-section, for receiving the roller bar 130 therein.

The biasing mechanism 150 also comprises a coil spring 154 (shown in FIGS. 9 and 12) mounted to the frame 124 and frame arm 126. The coil spring 150 is mounted so as to resist pivotal movement of the frame arm 126 along an arcuate path below the bottom of the trailer 100.

When the roller assemblies 120 are in the covered position and the tarpaulin 140 is extended over the opening 102 of the trailer 100, the user can operate the motor 128 to further unroll the tarpaulin 140 from the roller arm 130, causing the frame arms 126 to pivot further downward, moving the roller arm 130 in an arcuate path below the bottom of the trailer 100. A slot (not shown) is provided in the frame arm 126 allows the roller bar 130 to move horizontally under the trailer 100 and behind the flange 152. The roller bar 130 eventually comes to rest behind, and is received by the flange 152, and is held in this position by the tension provided by the coil spring 154.

It will be apparent to those having ordinary skill in the art that certain adaptations and modifications of the described embodiments can be made, consistent with and without departing from the present invention. Unless otherwise indicated, the embodiments described in the invention shall be understood to be non-exclusive of each other such that any embodiment can include different features of other embodiments. Therefore, the above discussed embodiments are considered to be illustrative and not restrictive. Other embodiments consistent with the present invention will become apparent from consideration of the specification and the practice of the present invention taught and suggested herein. Accordingly, the specification and the embodiments disclosed therein are to be considered exemplary only, with the true scope of the present invention being identified in the following claims.

The invention claimed is:

1. A system for selectively covering and uncovering an opening of a trailer for trucks, comprising:
    at least two tracks mounted to the trailer;
    at least two roller assemblies, each mounted for linear rolling movement along one of the tracks between a covered position and an uncovered position;
    an elongate roller bar extending between and supported by the at least two roller assemblies;
    a drive mechanism operatively connected to the roller bar to rotate the roller bar about its elongate axis; and
    a tarpaulin, the tarpaulin extending over and covering the opening when the roller assemblies are in the covered position, the tarpaulin being supported in a rolled fashion on the roller bar, leaving the opening uncovered, when the roller assemblies are in the uncovered position.

2. The system of claim 1, further comprising a biasing mechanism for holding the roller assemblies in the covered position.

3. The system of claim 2, wherein the biasing mechanism comprises an elongate flange extending along an edge of the trailer, for engaging and supporting the roller bar, and a spring member operatively mounted to the roller assembly to resist movement of the roller bar into engagement with the elongate flange.

4. The system of claim 1, wherein the drive mechanism comprises an electric motor.

5. The system of claim 4, wherein the electric motors receive electrical power from a battery of the truck.

6. The system of claim 4, wherein the electric motors receive electrical power from a source external to the truck.

7. The system of claim 1, wherein the opening is on a side surface of the trailer.

8. The system of claim 1, wherein the opening is on a top surface of the trailer.

9. The system of claim 1, wherein the opening extends from a side surface of the trailer to a top surface of the trailer.

10. A system for selectively covering and uncovering an opening of a trailer for trucks, comprising:
    at least two tracks mounted to the trailer;
    at least two roller assemblies, each mounted for linear rolling movement along one of the tracks between a covered position and an uncovered position;
    an elongate roller bar extending between and supported by the at least two roller assemblies; and
    a drive mechanism operatively connected to the roller bar to rotate the roller bar about its elongate axis;
    the roller bar adapted to receive a cover in a rolled configuration in which the opening of the trailer is not covered by the cover, when the roller assemblies are in the uncovered position, said roller bar further adapted to receive the cover in an unrolled configuration in which the cover covers the opening, when the roller assemblies are in the covered position.

11. The system of claim 10, further comprising a biasing mechanism for holding the roller assemblies in the covered position.

12. The system of claim 11, wherein the biasing mechanism comprises an elongate flange extending along an edge of the trailer, for engaging and supporting the roller bar, and a spring member operatively mounted to the roller assembly to resist movement of the roller bar into engagement with the elongate flange.

13. The system of claim 10, wherein the drive mechanism comprises an electric motor.

14. The system of claim 13, wherein the electric motors receive electrical power from a battery of the truck.

15. The system of claim 13, wherein the electric motors receive electrical power from a source external to the truck.

16. The system of claim 10, wherein the opening is on a side surface of the trailer.

17. The system of claim 10, wherein the opening is on a top surface of the trailer.

18. The system of claim 10, wherein the opening extends from a side surface of the trailer to a top surface of the trailer.

19. The system of claim 10, wherein the cover is a tarpaulin.

* * * * *